US 10,736,120 B1

(12) United States Patent
Marupaduga et al.

(10) Patent No.: US 10,736,120 B1
(45) Date of Patent: Aug. 4, 2020

(54) CONTROLLING BASE STATION SELECTION BASED ON MINIMUM SERVICE-BEAM BEAMWIDTH CAPABILITY (71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 42 days.

(21) Appl. No.: 16/225,923

(22) Filed: Dec. 19, 2018

(51) Int. Cl.
*H04W 72/08* (2009.01)
*H04W 16/28* (2009.01)
*H04W 28/02* (2009.01)
*H04W 48/16* (2009.01)
*H04W 72/04* (2009.01)
*H04W 24/10* (2009.01)
*H04B 7/06* (2006.01)
*H04W 48/20* (2009.01)

(52) U.S. Cl.
CPC ........ *H04W 72/085* (2013.01); *H04B 7/0617* (2013.01); *H04W 16/28* (2013.01); *H04W 24/10* (2013.01); *H04W 28/0268* (2013.01); *H04W 48/16* (2013.01); *H04W 48/20* (2013.01); *H04W 72/046* (2013.01)

(58) Field of Classification Search
CPC ... H04W 72/085; H04W 16/28; H04W 24/10; H04W 28/0268; H04W 48/16; H04W 48/20; H04W 72/046; H04B 7/0617
See application file for complete search history.

(56) References Cited

U.S. PATENT DOCUMENTS

| 2014/0177607 | A1* | 6/2014 | Li | H04B 7/0695 370/336 |
| 2015/0351041 | A1* | 12/2015 | Senarath | H04W 72/1231 370/329 |
| 2016/0099761 | A1* | 4/2016 | Chen | H04B 7/0408 370/336 |
| 2017/0359826 | A1* | 12/2017 | Islam | H04L 5/0048 |

* cited by examiner

Primary Examiner — Duc C Ho (57) ABSTRACT

When a WCD is within coverage of multiple base stations, the minimum service-beam beamwidths of the base stations will be taken into account as a basis to select a base station to serve the WCD. For instance, the minimum service-beam beamwidths of the base stations could be compared, and the base station having the narrowest minimum service-beam beamwidth could be selected. In addition, this could be done specifically for a WCD that will engage in guaranteed-bit-rate (GBR) communication, such as a voice or video call or online gaming for instance. Beamforming could be particularly helpful for such a WCD, as the beamforming could help ensure that transmissions to the WCD meet the bit-rate guarantee. And beamforming with a narrower service-beam beamwidth could better help achieve that goal.

20 Claims, 5 Drawing Sheets

ABLERUS 10,736,120 B1

CONTROLLING BASE STATION SELECTION BASED ON MINIMUM SERVICE-BEAM BEAMWIDTH CAPABILITY

BACKGROUND

A wireless communication system typically includes a number of base stations that are configured to provide wireless coverage areas in which wireless communication devices (WCDs) such as cell phones, tablet computers, tracking devices, embedded wireless modules, and other wirelessly equipped communication devices (whether or not user operated), can operate. In turn, each base station could be coupled with a core network that provides connectivity with one or more transport networks, such as the public switched telephone network (PSTN) and/or the Internet for instance. With this arrangement, a WCD within coverage of the system could engage in air interface communication with a base station and could thereby communicate via the base station with various remote network entities or with other WCDs served by the base station.

Such a system could operate in accordance with a particular radio access technology, with air-interface communications from the base stations to WCDs defining a downlink or forward link and air-interface communications from the WCDs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance various radio access technologies, each base station could be configured to provide service on one or more carrier frequencies or "carriers." Each carrier could be frequency division duplex (FDD), defining separate frequency channels for downlink and uplink communication, or time division duplex (TDD), defining a single frequency channel multiplexed over time between downlink and uplink use. Each frequency channel of a carrier may occupy a particular frequency bandwidth defining a range of frequency at a particular position (e.g., defined by a center frequency) in radio-frequency spectrum.

Further, on the downlink and uplink, each carrier could be structured to define various physical channels for carrying information between the base stations and WCDs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data. Further, certain PRBs or other resources per subframe could be reserved for special use.

When a WCD enters into coverage of such a system, the WCD could discover threshold strong coverage on a base station's carrier and could responsively engage in signaling to connect with the base station on that carrier and to attach or register for service if appropriate. The base station could then serve the WCD, coordinating use of the carrier's air-interface resources on an as-needed basis. For example, when the base station has data to transmit to the WCD, the base station could allocate particular downlink air-interface resources to carry that data and could accordingly transmit the data to the WCD on the allocated downlink resources. And when the WCD has data to transmit to the base station, the WCD could transmit to the base station an uplink resource request, the base station could responsively allocate particular uplink air-interface resources to carry the data, and the WCD could then transmit the data to the base station on the allocated uplink resources.

OVERVIEW

In a representative wireless communication system, each base station includes an antenna structure that radiates electromagnetic signals in a region defined by an antenna pattern or radiation pattern. The antenna pattern defines a scope of coverage in which the base station can engage in downlink transmission to WCDs. In particular, the antenna pattern may define a main lobe and could be characterized by an azimuth angle and a beamwidth. In polar coordinates within a horizontal plane, the azimuth angle defines a direction of radiation of the main lobe as an angle of rotation around a vertical axis, in relation to North (zero degrees) for instance, and the beamwidth defines an angular width of the main lobe, typically measured between half-power (−3 dB) points of the main lobe.

In addition, each base station may also be configured to selectively beamform downlink transmission to individual WCDs, with relatively narrow service beams defined within the base station's coverage beamwidth.

To beamform transmission to a WCD, a base station could receive from the WCD certain uplink control signaling that carries or embodies information regarding the path of transmission from the WCD (such as phase information, precoding matrix information, or the like), and the base station could use that information as a basis to direct downlink transmission in a service beam pointed specifically to the WCD's location.

For example, the base station's antenna structure could include multiple antennas (e.g., an antenna array), and the base station could receive from the WCD a signal arriving concurrently at each of various horizontally-spaced antennas. As the base station receives the signal, the base station could determine the phase of the signal respectively arriving at each such antenna, and the difference in those phases could establish an angle of arrival of the signal (e.g., in relation to the base station's azimuth). To beamform a transmission to the WCD, the base station could then use those determined phases and/or one or more other data points, to weigh and/or otherwise configure output from each of various transmit antennas so that the output from those antennas cooperatively combines to form a service beam pointed in the direction of the WCD.

A base station could usefully employ beamforming to help improve the quality of transmission to a WCD, as beamforming could enable the base station to focus energy of the transmission on the service beam rather than distributing the energy throughout the base station's coverage beamwidth. Further, the base station could usefully employ beamforming to support various services that depend on beamforming to help distinguish transmissions. For instance, the base station could use beamforming to facilitate Multi-User Multiple-Input-Multiple-Output (MU-MIMO) service, where the base station beamforms separately to each of multiple angularly-separated WCDs concurrently on the same air interfaces (e.g., PRBs) as each other.

Although each base station in a region may be configured to support beamforming, the base stations may differ from each other in terms of how narrow they can establish service beams directed to individual WCDs. Due to differences in antenna configuration and/or differences in other hardware or software, each of two or more base stations may have a different minimum service-beam beamwidth than each other. For instance, one base station might be able to generate service beams as narrow as 8°, while another base station might be able to generate service beams no narrower than 15°. Other examples are possible as well.

This difference in configuration between base stations may arise from the base stations (or their associated antenna structures or other supporting hardware or software) being manufactured otherwise provided by different vendors. For instance, base stations made by one manufacture might have one minimum service-beam beamwidth, while base stations made by another manufacturer might have a different minimum service-beam beamwidth. Alternatively, the difference in minimum service-beam beamwidth from one base station to another might exist for other reasons.

The present disclosure provides for leveraging this difference in minimum service-beam beamwidth to the advantage of WCDs. In particular, the disclosure provides that when a WCD is within coverage of multiple base stations, the minimum service-beam beamwidths of the base stations will be taken into account as a basis to select a base station to serve the WCD. In a representative implementation, the minimum service-beam beamwidths of the base stations will be compared, and the base station having the narrowest minimum service-beam beamwidth will be selected.

Further, this could be done specifically for a WCD that will engage in guaranteed-bit-rate (GBR) communication, such as a voice or video call or online gaming for instance. Beamforming could be particularly helpful for such a WCD, as the beamforming could help ensure that transmissions to the WCD meet the bit-rate guarantee. And beamforming with a narrower service-beam beamwidth could better help achieve that goal.

Thus, per the present disclosure, when a WCD could be served by any of multiple base stations and the WCD is going to engage in GBR communication, the base station with the narrowest minimum service-beam beamwidth (or one such base station, if multiple exist) could be selected. And the WCD could be made to be served by the selected base station, so as to possibly benefit from the base station's relatively narrow beamforming capability.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

Figure 1:
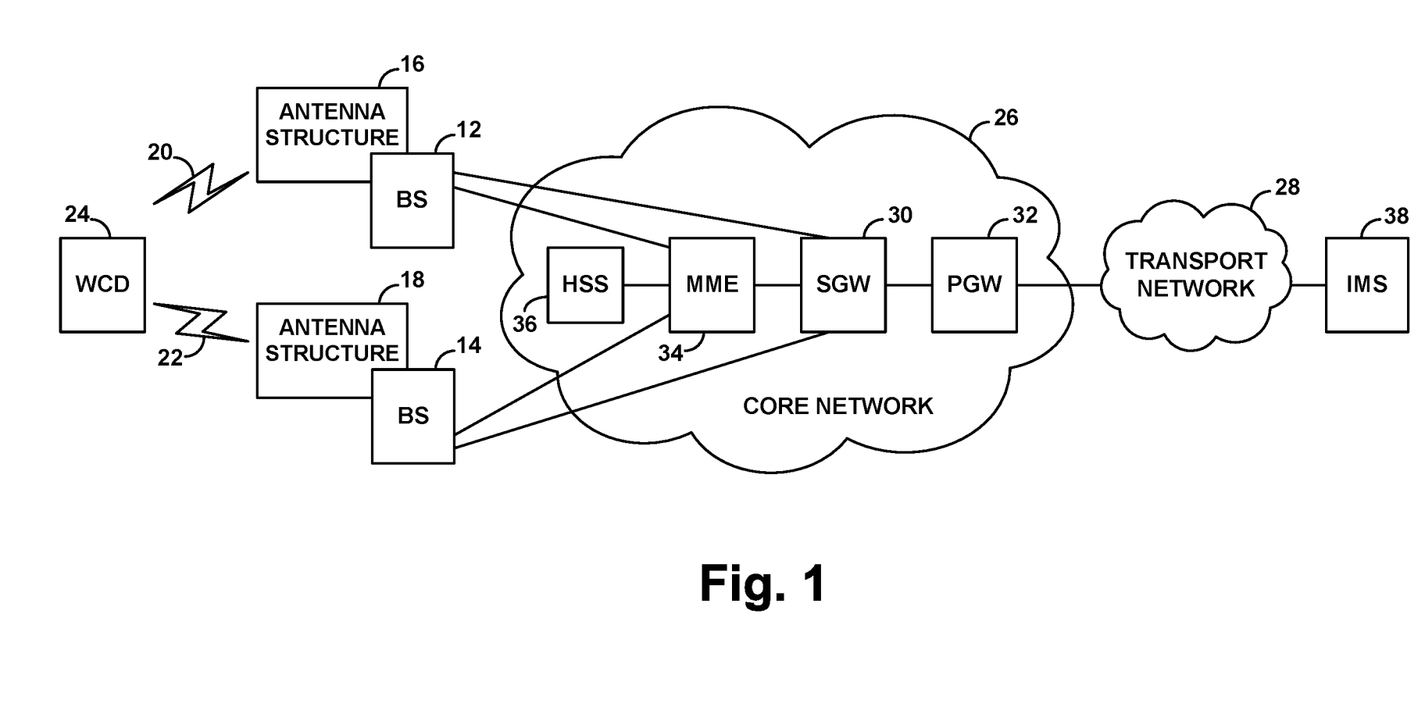
FIG. 1 is a simplified block diagram of a network arrangement in which aspects of the present disclosure can be implemented.

As shown in FIG. 1, the example wireless communication system includes two representative base stations 12, 14, each including a respective antenna structure 16, 18, and each radiating to provide respective wireless coverage 20, 22 in which to serve WCDs. Shown operating within coverage of the base stations is then a representative WCD 24, which could be one of the types noted above, among other possibilities. Although only two base stations are shown providing coverage where WCD 24 is located, a representative implementation could include more than two base stations.

Each base station could take any of a variety of forms, and the base stations could differ from each other in form. For instance, each base station could be a macro base station of the type configured to provide a wide range of coverage, with its antenna structure being mounted on a tower or other tall structure. Alternatively, each base station could take other forms, such as a small cell base station, a repeater, a femtocell base station, or the like, which might be configured to provide a smaller range of coverage, possibly with an integrated or externally mounted antenna structure. Further, each base station could be configured to operate according to a 4G, 5G, or other radio access technology, and the base stations could operate according to different radio access technologies than each other. For instance, either or each base station could be an LTE evolved Node-B (eNB) or a 5GNR gigabit Node-B (gNB), among other possibilities.

Base stations 12, 14 are both shown coupled with a core network 26, which could be an enhanced packet core (EPC) network, a next generation core (NGC) network, or another network including components supporting an applicable radio access technology and providing connectivity with at least one transport network 28, such as the Internet. Alternatively, the base stations could be coupled with different core networks that provide transport network connectivity or serve other purposes.

In an example implementation as shown, the core network 26 includes a serving gateway (SGW) 30, a packet data network gateway (PGW) 32, a mobility management entity (MME) 34, and a Home Subscriber Server (HSS) 36. Each base station is shown having an interface with the SGW and having an interface with the MME, the SGW is shown additionally having an interface with the PGW and having an interface with the MME, the MME is shown additionally having an interface with the HSS, and the PGW is shown providing connectivity with the transport network.

With this arrangement, the SGW and PGW cooperatively provide user-plane connectivity between each base station and the transport network, so that when the WCD is served by the base station, the WCD can engage in communication on the transport network. And the MME operates as a controller to carry out operations such as coordinating WCD attachment and setup of user-plane bearers. Further, the HSS includes or has access to a data store containing WCD capabilities and service profile data and can work with the MME to facilitate WCD authentication.

Further shown accessible through the core network 26 in the example implementation is an Internet Multimedia Subsystem (IMS) 38. The IMS operates to support packet-based real-time media services, such as voice-over-packet service for instance. To facilitate this, the IMS could include various proxy servers operable to engage in IMS signaling, such as Session Initiation Protocol (SIP) signaling, to set up communication sessions, and various media servers operable to bridge or otherwise support such sessions. When a WCD is connected with a base station and has transport-network connectivity, the WCD could thus engage in IMS signaling with the IMS to set up voice calls or other such communications with remote parties, and the WCD could then engage in bearer communication in the established sessions via the IMS.

As discussed above, the air interface between the base station and WCDs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and WCDs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to WCDs. And other resource elements per subframe could be reserved to define a shared channel in which PRBs could carry scheduled data communications from the base station to WCDs.

Further, in certain downlink subframes, a group of resource elements centered on the center frequency of each carrier could be reserved to carry synchronization signals that WCDs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that WCDs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from WCDs to the base station. And other resource elements per subframe could be reserved to define a shared channel in which PRBs could carry scheduled data communications from WCDs to the base station. Further, still other resources on the uplink could be reserved for other purposes as well. For instance, certain resource elements on the uplink could be assigned on a per-WCD basis to carry a sounding reference signal (SRS) from the WCD to the base station, which the base station could use as a basis to determine the WCD's angle of arrival.

When a WCD enters into coverage of the base station, the WCD could detect the base station's synchronization signal as an indication of coverage provided by the base station on a carrier, and the WCD could then read the base station's MIB or the like to determine the carrier's bandwidth, and the WCD could evaluate the base station's reference signal on that carrier to determine that coverage is strong enough to support a connection. The WCD could then engage in random access signaling and Radio Resource Control (RRC) configuration signaling with the base station to connect with the base station on the carrier, thus putting the WCD in an RRC-connected mode.

Once the WCD is connected with the base station, the WCD could then transmit to the base station an attach request, which the base station could forward to the MME for processing. And after working with the HSS to authenticate the WCD, the MME could coordinate setup for the WCD of one or more user-plane bearers between the base station and the PGW, to enable the WCD to engage in communication on the transport network.

Each such bearer established for a WCD could define a virtual packet-tunnel that extends between the WCD and the PGW, including a radio bearer portion between the WCD and the base station and an access bearer portion between the base station and the PGW. And each bearer could have a designated Quality-of-Service Class Indicator (QCI) that establishes particular quality-of-service parameters to be applied for routing data over the bearer. Examples of such quality-of-service parameters could include allocation and retention priority, guaranteed bit rate (GBR) (having a minimum bit-rate guarantee), and maximum bit rate, among other possibilities.

In an example implementation, QCI values 1-4 could represent GBR bearers, such as bearers for carrying conversational voice or real-time gaming or video streaming, while QCI values 5-9 could represent non-GBR bearers, such as bearers for carrying general packet-data communications, IMS signaling, and the like.

When a WCD initially attaches, the MME could establish for the WCD one or more non-GBR bearers. For instance, the MME could establish for the WCD a QCI-9 bearer to carry general packet-data communication, and if the WCD's service profile indicates that the WCD supports IMS services, the MME could establish for the WCD a QCI-5 bearer to carry IMS signaling.

In addition, at the time of initial attachment or more likely later, the MME could establish for the WCD a GBR bearer. For instance, when the WCD and IMS engage in signaling to set up a voice-over-packet call, the MME could responsively set up for the WCD a QCI-1 bearer to carry the associated voice data. Likewise, if the WCD initiates a real-time video-streaming session, the MME could responsively set up for the WCD a QCI-4 bearer to carry the associated video data. When the MME establishes such a GBR bearer, the MME could engage in signaling with the WCD's serving base station, and the base station could responsively set itself to reserve air interface resources as appropriate to support the bit-rate guarantee and other attributes of the GBR bearer. Further, signaling could pass to the WCD to inform the WCD of each such established bearer.

In line with the discussion above, base stations 12, 14 could each support beamforming. To facilitate this, each base station's respective antenna structure 16, 18 could include multiple antennas, such as an antenna array or the like, and each base station could be configured with hardware and/or software logic to dynamically adjust phases, amplitudes and/or other aspects of transmission per antenna in order to generate service beams directed to individual WCDs. Alternatively, each base station could be configured in another manner to facilitate providing beamformed transmissions.

In addition, as discussed above, the base stations could have different minimum service-beam beamwidths than each other. For instance, base station 12 may be able to establish a service beam as narrow as 8°, while base station 14 may be able to establish a service beam only as narrow as 15°, among other possibilities.

A base station's minimum service-beam beamwidth is the narrowest that the base station can establish a service beam (in terms of the base station's physical capability or other restrictions), possibly resulting from hardware and/or software configuration. The base station might be configured to structure every service beam to have the base station's minimum service-beam beamwidth (in which case a base station's minimum service-beam beamwidth could be more generally the base station's service-beam beamwidth). Or the base station might be configured to structure different service beams to have different beamwidths, the narrowest being the base station's minimum service-beam beamwidth.

As discussed above, the present disclosure provides for leveraging this difference in minimum service-beam beamwidths as a basis to control which base station will serve the WCD. This process could be carried out by the WCD and/or by a base station that is currently serving the WCD or is about to serve the WCD, and the consideration of minimum service-beam beamwidth could be taken into consideration along with one or more other factors, such as signal strength, load, and proximity for instance. Further, the process could be carried out specifically when the WCD is going to engage in GBR communication, such as when the WCD has or is about to have a GBR bearer, among other possibilities.

To facilitate carrying out this process, each base station could be provisioned with a specification of the base station's minimum service-beam beamwidth and perhaps with neighbor data that specifies the minimum service-beam beamwidth of each base station that neighbors the base station (e.g., each base station that provides coverage partly or fully overlapping with the base station's own coverage). These specifications could be angular-width values and/or indexes representing such values or ranges of values for instance. And each base station could be provisioned with various such data at the time of manufacture and/or deployment, by engineering input and/or through automated discovery, among other possibilities.

Further, each base station could be configured to broadcast an indication of its minimum service-beam beamwidth. For instance, each base station could include a specification or other indication of its minimum service-beam beamwidth in a MIB or other broadcast message that the base station broadcasts within its coverage.

In a representative implementation, the issue of which base station should serve the WCD would arise when the WCD is positioned within coverage of at least two base stations, such as within coverage of both base station 12 and base station 14, and where the WCD could be served by any of the base stations. For instance, the issue could arise when the WCD is at or near an equal power boundary between the base stations and/or where one or more other factors could support the WCD being served by either base station.

In an example implementation, the process could be implemented by the WCD when the WCD is not yet served by any or either base station that could now serve the WCD and when the WCD is working to decide which base station to connect with (initially or in a handover scenario). Alternatively, the WCD could implement the process when the WCD has connected with one of the base stations but has transitioned to an RRC idle mode (e.g., as a result of not engaging in data communication for a threshold period of time) or is otherwise operating in a discontinuous reception mode or the like. And still alternatively, the WCD could implement the process when the WCD is currently in an RRC connected mode served by a base station.

In any of these situations, the WCD could discover threshold strong coverage of both base stations and could read each base station's MIB or otherwise determine the base station's minimum service-beam beamwidth. The WCD could then compare the base stations' respective minimum service-beam beamwidths and could thereby determine that base station 12 has a narrower service-beam beamwidth than base station 14. And based at least in part on that determination, the WCD could opt to be served by base station 12 rather than by base station 14. If the WCD is not yet served by either base station, then the WCD could then responsively engage in signaling to connect with and be served by base station 12. Whereas, if the WCD is already served by base station 12, then the WCD could responsively stay served by base station 12. And if the WCD is already served by base station 14, then the WCD could responsively hand over to be connected with and served by base station 14.

These examples could also occur specifically when the WCD is going to engage in GBR communication, perhaps conditioned on the existence of that situation. For instance, if the WCD is of a type that supports voice-over-packet calling, the WCD might carry out the process in response to the WCD receiving user input requesting initiation of a voice call or user input suggesting that the WCD may soon initiate a voice call (such as user accessing of a telephone application running on the WCD). Alternatively or additionally, the WCD could carry out the process in response to the WCD determining that the WCD has or is about to have a GBR bearer, such as upon initiation of IMS signaling that is likely to lead to setup of such a bearer, among other possibilities. Whereas, if the WCD is not going to engage in GBR communication, the WCD might not carry out the process.

In another example implementation, the process could be implemented by a base station that is about to serve the WCD or that is currently serving the WCD. For instance, the process could be implemented in response to the WCD having connected with the base station and/or attached via the base station and could involve controlling whether the base station will continue to serve the WCD or rather whether the base station should hand over the WCD to a different base station.

By way of example, the WCD might be connected with a base station other than those shown in FIG. 1, and the WCD might be in poor coverage of the base station and may therefore have provided the base station with a measurement report indicating that the WCD has detected threshold strong coverage of both base station 12 and base station 14. In that situation, the WCD's serving base station may face question of which of base stations 12, 14 to hand over the WCD to. To resolve that question, the WCD's serving base station could consult neighbor data to determine the minimum service-beam beamwidth of each candidate target base station and could determine that base station 12 has a narrower minimum service-beam beamwidth than base station 14. Based at least on that determination, the WCD's serving base station could then hand over the WCD to base station 12 rather than to base station 14.

And as another example, the WCD might be currently served by one of base station's 12, 14, and the WCD's serving base station might determine based on measurement reporting and/or other data that the WCD could be continue to be served by it or could instead transition to be served by the other of base stations 12, 14. In that situation, the WCD's serving base station could likewise consult neighbor data to determine the minimum service-beam beamwidth of the other base station and could determine which of base stations 12, 14 has the narrower minimum service-beam beamwidth.

And the WCD's serving base station could decide how to proceed based at least in part on that determination. If the WCD's serving base station determines that it has the narrower minimum service-beam beamwidth, then based at least in part on that determination, the WCD's serving base station may continue to serve the WCD and may thus forgo handing over the WCD to the other base station. Whereas, if the WCD's serving base station determines that the other base station has the narrower minimum service-beam beamwidth, then based at least in part on that determination, the WCD's serving base station may hand over the WCD to the other base station to be served.

In these examples too, the process could be carried out specifically when the WCD is going to engage in GBR communication, perhaps conditioned on the existence of that situation. For instance, the process could occur in response to the WCD's serving base station receiving signaling from the MME related to setup of a GBR bearer for the WCD, or in response to determining that a GBR bearer is already established for the WCD, among other possibilities.

Note also that the disclosed process could result in a determination that two of the at least two base stations that could serve the WCD (optimally less than all such base stations) both of the narrowest service-beam beamwidth of the at least two base stations. In that case, selection between those tied base stations could be done based on one or more other factors.

Figure 2:
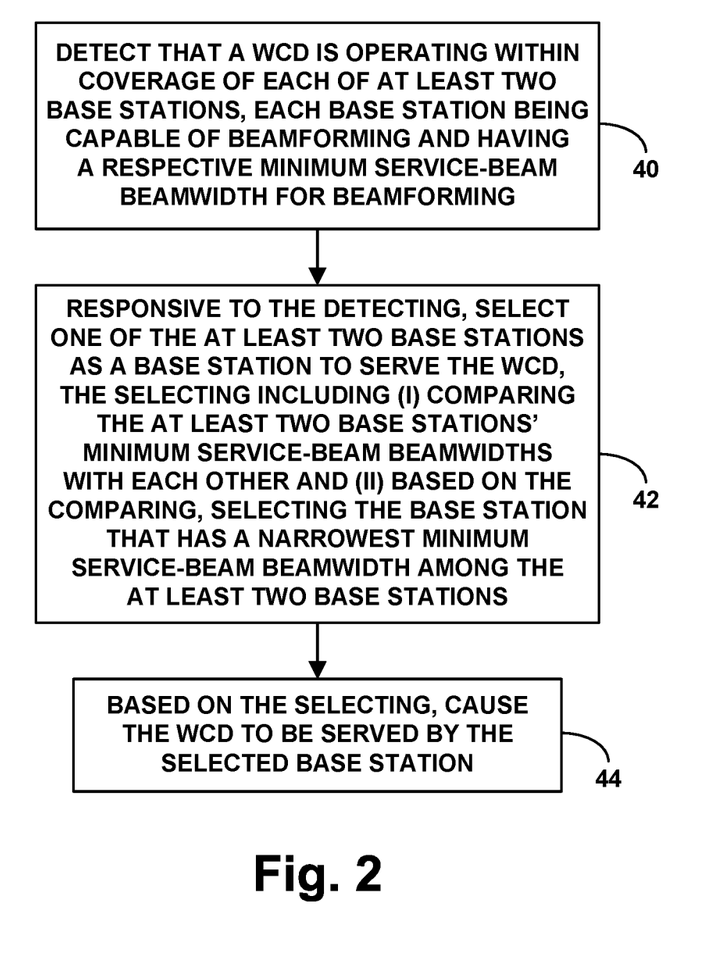
FIG. 2 is a flow chart depicting operations that can be carried out in accordance with the disclosure.

FIG. 2 is a flow chart depicting a method that can be carried out in accordance with this disclosure, to control base station selection in a wireless communication system.

As shown in FIG. 2, at block 40, the method includes detecting that a WCD is operating within coverage of each of at least two base stations, wherein each base station is capable of beamforming and has a respective minimum service-beam beamwidth for beamforming. At block 42, the method then includes, responsive to the detecting (i.e., based at least in part on the detecting), selecting one of the at least two base stations as a base station to serve the WCD, where the selecting comprises (i) comparing the at least two base stations' minimum service-beam beamwidths with each other and (ii) based on the comparing, selecting the base station that has a narrowest minimum service-beam beamwidth among the at least two base stations. And at block 44, the method includes, based on the selecting (i.e., in view of the selection), causing the WCD to be served by the selected base station.

Further, as discussed above, the method could additionally include determining that the WCD will engage in a GBR communication, with the selecting of the base station being additionally responsive to that determination. For instance, the method could be carried out in response to detecting a trigger to initiated a GBR communication, such as a GBR communication that comprises a voice call.

In that situation, the selecting could occur before the WCD engages in the GBR communication or could occur once the WCD has begun engaging in the GBR communication. Alternatively or as part of that process, the method could additionally include determining that the WCD has an established GBR bearer, in which case the act of selecting of the base station could be additionally responsive to determining that the WCD has the established GBR bearer.

As also discussed above, this method could be carried out by the WCD. And in that case, the act of comparing the at least two base station's minimum service-beam beamwidths with each other could involve (i) the WCD receiving, from the at least two base stations indications of the at least two base stations' respective minimum service-beam beamwidths (e.g., receiving respectively from each base station a MIB and/or other message indicating the minimum service-beam beamwidth of the base station) and (ii) the WCD comparing the indicated minimum service-beam beamwidths.

Further, the act of causing the WCD to be served by the selected base station could involve (i) if the WCD is already connected with the selected base station, then the WCD staying connected with the selected base station to be served by the selected base station and (ii) if the WCD is not already connected with the selected base station, then the WCD connecting by the WCD with the selected base station to be served by the selected base station.

Alternatively, as also discussed above, the method could be carried out by a base station that is currently serving the WCD, which could also be one of the at least two base stations at issue. And in that case, the act of detecting that the WCD is operating within coverage of each of at least two base stations could involve the serving base station receiving from the WCD a measurement report indicating coverage of at least one neighboring base station detected by the WCD, the at least two base stations including at least the neighboring base station.

Further, the act of comparing the at least two base stations' minimum service-beam beamwidths with each other could involve (i) referring to neighbor data to determine the minimum service-beam beamwidth of the neighboring base station and (ii) comparing the determined minimum service-beam beamwidth of the neighboring base station with the minimum service-beam beamwidth of each other base station of the at least two base stations. And the act of causing the WCD to be served by the selected base station could involve (i) if the selected base station is the neighboring base station, then handing over the WCD from being served by the serving base station to being served by the neighboring base station and (ii) if the selected base station is another base station (perhaps the serving base station), then causing the WCD to be served (e.g., to continue to be served) instead by the other base station.

Figure 3:
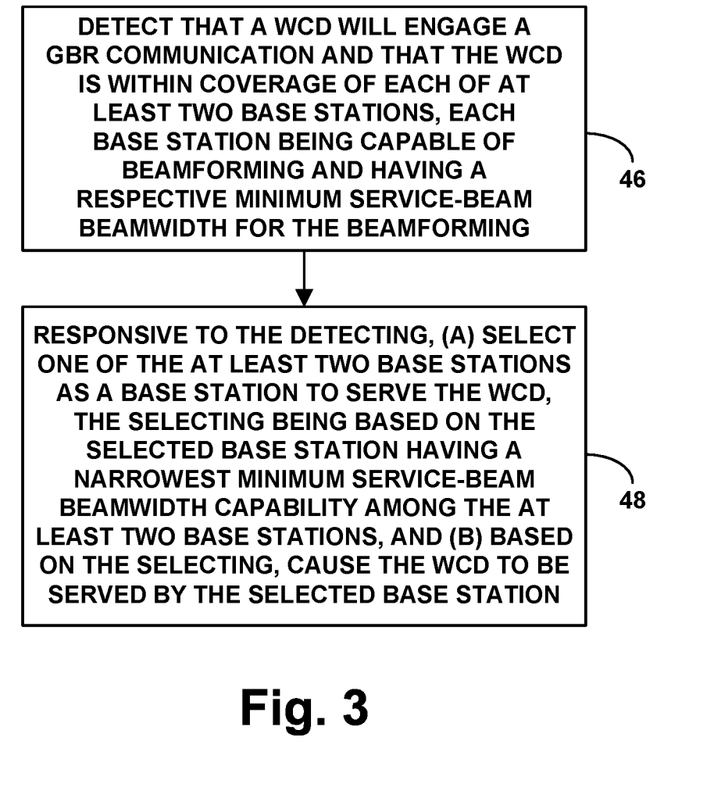
FIG. 3 is another flow chart depicting operations that can be carried out in accordance with the disclosure.

FIG. 3 is another flow chart depicting a method that can be carried out in accordance with this disclosure, to control base station selection in a wireless communication system.

As shown in FIG. 3, at block 46, the method includes detecting that a WCD will engage a GBR communication and that the WCD is within coverage of each of at least two base stations, each base station being capable of beamforming and having a respective minimum service-beam beamwidth for the beamforming. And at block 48, the method includes, responsive to the detecting (i.e., based at least in part on the detecting), (a) selecting one of the at least two base stations as a base station to serve the WCD, the selecting being based on the selected base station having a narrowest minimum service-beam beamwidth capability among the at least two base stations, and (b) based on the selecting (i.e., in view of the selection), causing the WCD to be served by the selected base station.

Features discussed above can be implemented in this context and vice versa. For instance, the GBR communication at issue could comprise a voice call. And the method could be carried out by the WCD and/or by a base station currently serving the WCD.

Figure 4:
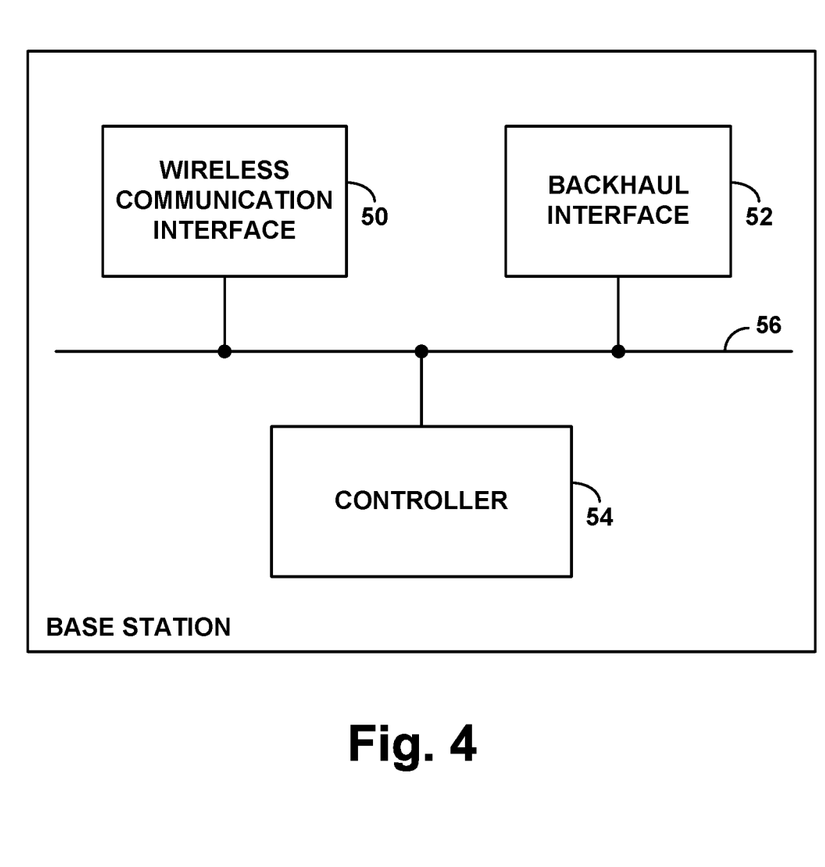
FIG. 4 is a simplified block diagram of an example base station operable in accordance with the disclosure.

FIG. 4 is a simplified block diagram of an example base station operable in accordance with present disclosure. As shown, the example base station includes a wireless communication interface 50, a backhaul interface 52, and a controller 54, all of which may be communicatively linked together by a system bus, network, or other connection mechanism 56 and/or could be integrated together or distributed in various ways.

In this example arrangement, the wireless communication interface 50 may be configured to provide cellular coverage and to engage in air interface communication with served WCDs. As such, wireless communication interface 50 could comprise an antenna structure as discussed above, and associated components such as a power amplifier and a wireless transceiver, so as to facilitate providing a wireless coverage defining an air interface having a downlink and an uplink, and engaging in communication above. Further, backhaul interface 62 could comprise a wired or wireless interface, such as an Ethernet network communication interface, configured to support communication with other entities, such as with various core network entities and other base stations for instance.

Controller 54 could then comprise control logic to cause the base station to carry out particular operations including those described herein. As such, the controller 54 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding program instructions executable by the processing unit to cause the base station to carry out various operations described herein. It should also be understood that the present disclosure also contemplates a non-transitory computer readable medium having encoded thereon program instructions executable to carry out such operations as well.

Figure 5:
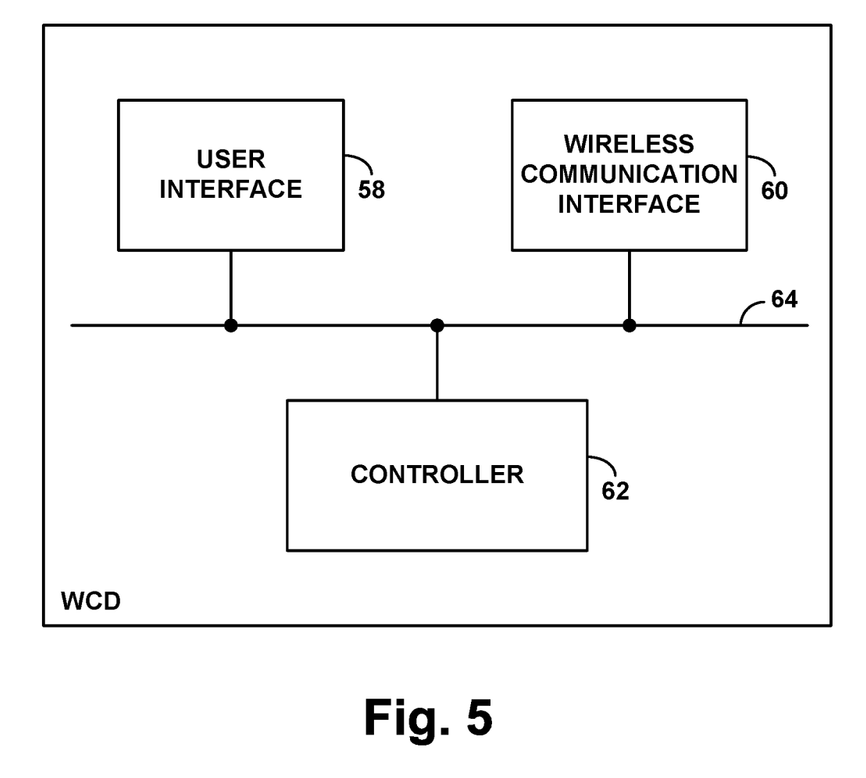
FIG. 5 is a simplified block diagram of an example WCD operable in accordance with the disclosure.

FIG. 5 is next a simplified block diagram of an example WCD operable in accordance with the present disclosure. A shown, the example WCD includes a user interface 58, a wireless communication interface 60, and a controller 62, all of which may be communicatively linked together by a system bus, network, or other connection mechanism 64 and/or could be integrated together or distributed in various ways.

In this example arrangement, the user interface 58 (which might be omitted if the WCD is not user operated, such as if the WCD is an automated voice communication device of some sort) could include input and output components that facilitate user interaction with the WCD. The wireless communication interface 60 could then be configured to be served by base stations as discussed above, in accordance with agreed air interface protocols, and could comprise an antenna structure, power amplifier, and wireless transceiver.

And the controller 62 could comprise control logic to cause the WCD to carry out particular operations including those described herein. For instance, the controller 62 could include a processing unit including one or more processors (e.g., general purpose microprocessors and/or dedicated processing units) and non-transitory data storage (e.g., one or more volatile and/or non-volatile storage components, such as magnetic, optical, or flash storage) holding program instructions executable by the processing unit to cause the WCD to carry out various operations described herein. And here too, the present disclosure also contemplates a non-transitory computer readable medium having encoded thereon program instructions executable to carry out such operations as well.

Further, other features described above can be incorporated in this context, and vice versa.

Exemplary embodiments have been described above. Those skilled in the art will understand, however, that changes and modifications may be made to these embodiments without departing from the true scope and spirit of the invention.

We claim:

1. A method for controlling base station selection in a wireless communication system, the method comprising:
   detecting that a wireless communication device (WCD) is operating within coverage of each of at least two base stations, wherein each base station is capable of beamforming and has a respective minimum service-beam beamwidth for beamforming;
   responsive to the detecting, selecting one of the at least two base stations as a base station to serve the WCD, wherein the selecting comprises (i) comparing the at least two base stations' minimum service-beam beamwidths with each other and (ii) based on the comparing, selecting the base station that has a narrowest minimum service-beam beamwidth among the at least two base stations; and
   based on the selecting, causing the WCD to be served by the selected base station.

2. The method of claim 1, further comprising determining that the WCD will engage in a guaranteed-bit-rate (GBR) communication, wherein the selecting of the base station is additionally responsive to the determining that the WCD will engage in the GBR communication.

3. The method of claim 2, wherein the selecting occurs before the WCD engages in the GBR communication.

4. The method of claim 1, further comprising determining that the WCD has an established guaranteed-bit-rate (GBR) bearer, wherein the selecting of the base station is additionally responsive to determining that the WCD has the established GBR bearer.

5. The method of claim 1, carried out by the WCD,
wherein comparing the at least two base station's minimum service-beam beamwidths with each other comprises (i) receiving by the WCD, from the at least two base stations, indications of the at least two base stations' respective minimum service-beam beamwidths and (ii) comparing by the WCD the indicated minimum service-beam beamwidths.

6. The method of claim 5, wherein receiving the indications of the at least two base stations' respective minimum service-beam beamwidths comprises receiving respectively from each base station of the at least two base stations a message indicating the minimum service-beam beamwidth of the base station.

7. The method of claim 6, wherein the message comprises a master information block (MIB) message broadcast by the base station.

8. The method of claim 5, wherein causing the WCD to be served by the selected base station comprises (i) if the WCD is already connected with the selected base station, then staying connected by the WCD with the selected base station to be served by the selected base station and (ii) if the WCD is not already connected with the selected base station, then connecting by the WCD with the selected base station to be served by the selected base station.

9. The method of claim 1, carried out by the WCD in response to the WCD detecting a trigger to initiate a guaranteed bit rate (GBR) communication.

10. The method of claim 9, wherein the GBR communication comprises a voice call.

11. The method of claim 1, carried out by a base station that is currently serving the WCD,
wherein detecting that the WCD is operating within coverage of each of at least two base stations comprises receiving by the serving base station from the WCD a measurement report indicating coverage of at least one neighboring base station detected by the WCD, wherein the at least two base stations includes the neighboring base station,
wherein comparing the at least two base stations' minimum service-beam beamwidths with each other comprises (i) referring to neighbor data to determine the minimum service-beam beamwidth of the neighboring base station and (ii) comparing the determined minimum service-beam beamwidth of the neighboring base station with the minimum service-beam beamwidth of each other base station of the at least two base stations.

12. The method of claim 11, wherein the at least two base stations further includes the base station currently serving the WCD.

13. A method for controlling base station selection in a wireless communication system, the method comprising:
detecting that a wireless communication device (WCD) will engage in a guaranteed-bit-rate (GBR) communication and that the WCD is within coverage of each of at least two base stations, wherein each base station is capable of beamforming and has a respective minimum service-beam beamwidth for the beamforming; and
responsive to the detecting, (a) selecting one of the at least two base stations as a base station to serve the WCD, the selecting being based on the selected base station having a narrowest minimum service-beam beamwidth capability among the at least two base stations, and (b) based on the selecting, causing the WCD to be served by the selected base station.

14. The method of claim 13, wherein the GBR communication comprises a voice call.

15. The method of claim 13, carried out by the WCD.

16. The method of claim 13, carried out by a base station currently serving the WCD.

17. A wireless communication device (WCD) comprising:
a user interface through which the WCD is configured to engage in user interaction;
a wireless communication interface through which the WCD is configured to engage in air interface communication according to at least one air interface protocol;
a controller comprising a processing unit and program instructions executable by the processing unit to carry out operations including:
detecting that the WCD will engage in a guaranteed-bit-rate (GBR) communication and that the WCD is within coverage of each of at least two base stations, wherein each base station is capable of beamforming and has a respective minimum service-beam beamwidth for the beamforming, and
responsive to the detecting, (a) selecting one of the at least two base stations as a base station to serve the WCD, the selecting being based on the selected base station having a narrowest minimum service-beam beamwidth capability among the at least two base stations, and (b) based on the selecting, causing the WCD to be served by the selected base station.

18. The WCD of claim 17, wherein the selecting of the base station based on the selected base station having the narrowest minimum service-beamwidth capability among the at least two base stations comprises (i) receiving, from the at least two base stations, indications of the at least two base stations' respective minimum service-beam beamwidths and (ii) comparing the indicated minimum service-beam beamwidths.

19. The WCD of claim 18, wherein receiving the indications of the at least two base stations' respective minimum service-beam beamwidths comprises receiving respectively from each base station of the at least two base stations a message indicating the minimum service-beam beamwidth of the base station.

20. The WCD of claim 17, wherein causing the WCD to be served by the selected base station comprises (i) if the WCD is already connected with the selected base station, then causing the WCD to stay connected with the selected base station to be served by the selected base station and (ii) if the WCD is not already connected with the selected base station, then causing the WCD to connect with the selected base station to be served by the selected base station.

\* \* \* \* \*